3,277,771
BLIND FASTENER WITH LOCKING COLLAR
Perry J. Reynolds, Detroit, Mich., assignor to Huck Manufacturing Company, Detroit, Mich., a corporation of Michigan
Filed Mar. 11, 1964, Ser. No. 351,086
3 Claims. (Cl. 85—72)

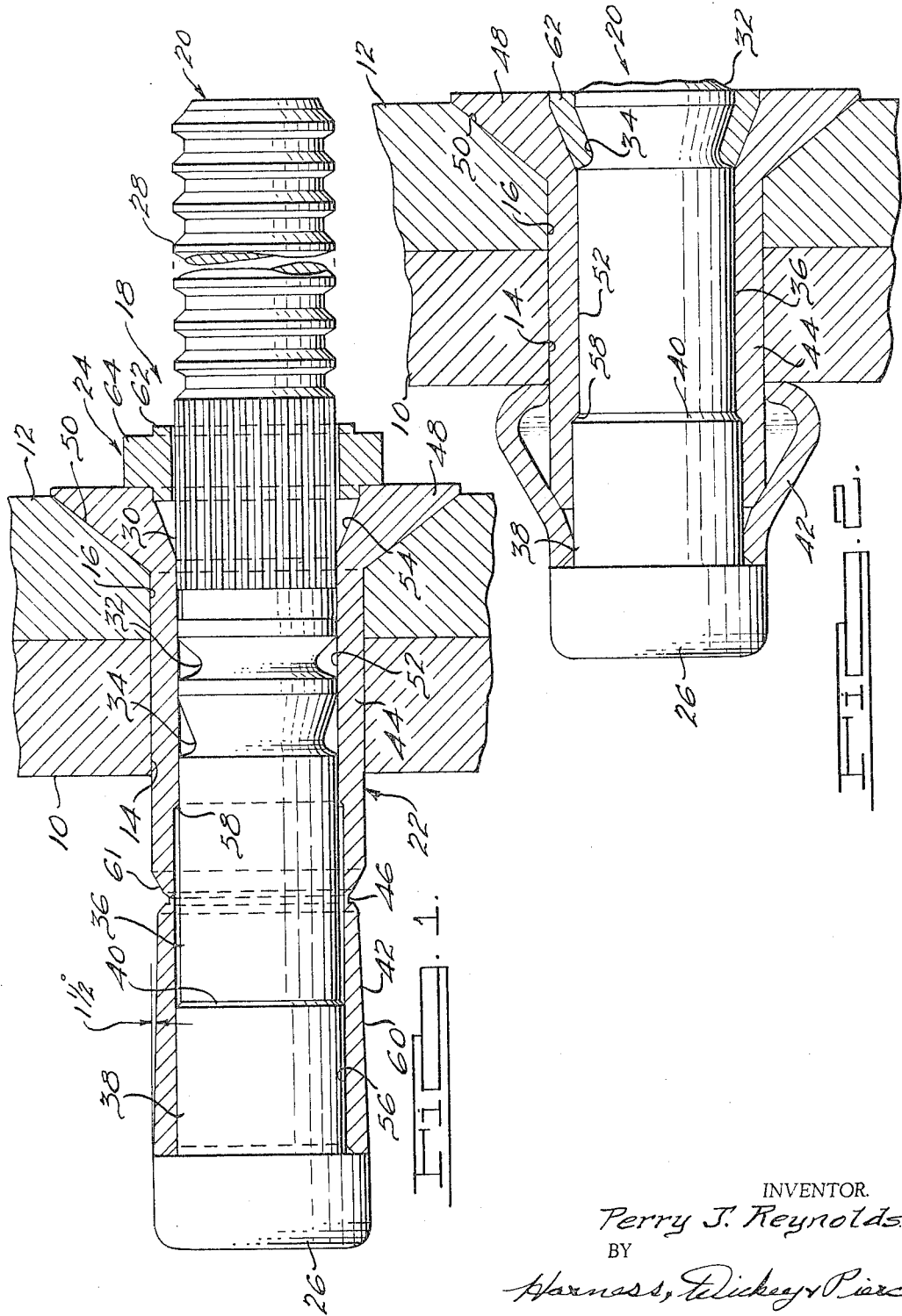

The present invention relates to improvements in blind fasteners.

More specifically, the present invention is an improvement over that type of blind fastener shown in the U.S. patent to H. G. Brilmyer, No. 2,887,003, issued May 19, 1959.

In fasteners of the above type it is desirable in providing maximum strength that the expanding sleeve begin to buckle at the rear sheet line rather than at some intermediate point. One problem with fasteners constructed in accordance with the above patent is that buckling of the expanding sleeve will not always occur at the rear sheet line. In the fastener of the present invention the expanding sleeve is provided with a gradually decreasing wall thickness from the end of the expanding sleeve located near the head of the pin towards the rear sheet line. This decreasing wall thickness is selected to be of a magnitude to insure buckling at the desired point.

Heretofore the expanding and filler sleeves have been constructed separately and hence have been assembled separately onto the pin. In the proposed construction the expanding and filler sleeves are formed integrally and are connected by a breakneck whereby as the fastener is set the two sleeve sections will be automatically separated and the fastener set in the conventional manner. If the expanding sleeve were separate and were tapered as previously indicated it would be possible to improperly assemble it onto the pin with the taper extending in the reverse direction. Thus, in addition to the advantages in fabrication and assembly, by providing a combination expanding and filler sleeve the taper on the expanding sleeve portion will be properly oriented upon assembly of the combination sleeve onto the pin.

In the construction of a fastener in accordance with the above named patent, a stop shoulder near the head of the pin engages the end of the filler sleeve and acts as a stop to locate the pin and filler sleeve in a selected position relative to each other such that a locking groove in the pin will be in the proper position in a cavity in the head of the filler sleeve to receive a locking collar whereby the pin and filler sleeve are positively locked together. It has been found that occasionally the end of the sleeve has expanded over the stop shoulder, thereby improperly positioning the locking groove relative to the cavity in the head of the filler sleeve. In the fastener of the present invention the end of the filler sleeve is counterbored and a shoulder provided intermediate its ends, which shoulder engages the stop shoulder on the pin. Since the filler sleeve shoulder is at a position removed from the end it expands less readily and hence improves the stop characteristics of the fastener as well as preventing the expanding sleeve from expanding over the head of the pin.

Other similar fasteners of this type create a highly undesirable stress or frettage corrosion condition immediately adjacent the hole due to the fact that only the end surface of the expanding sleeve engages the rear sheet line proximate the edge of the hole. This can cause the rear plate to corrode in this area adjacent the hole, thus allowing the fastener to become loose in service. In the present invention, the expanding sleeve will form a rounded bulb at the sheet line and will present a broad bearing surface against the workpiece, thereby distributing the stresses over a much greater area, which area is generally removed from the edge of the hole.

In view of the above it is a general object of this invention to provide an improved fastener of the type shown and described in the above patent to H. G. Brilmyer.

It is another object of this invention to provide a fastener of the above described type having improved stop characteristics.

It is a further object of this invention to provide a fastener of the above described type in which a combination expanding and filler sleeve is provided thereby facilitating fabrication and installation.

It is still another object of this invention to provide a fastener of the above described type in which the filler sleeve is constructed to assure bulbing or buckling at the rear sheet line.

Other objects, features, and advantages of the present invention will become apparent from the subsequent description and the appended claims, taken in conjunction with the accompanying drawings, in which:

FIGURE 1 is a cross-sectional view, with parts in elevation, illustrating a fastener embodying the features of the present invention, as assembled with a pair of workpieces to be secured, prior to any setting operation; and FIGURE 2 is a view depicting the parts of FIGURE 1 after the fastener has been set.

Looking now to FIGURE 1, a pair of workpieces 10 and 12 are shown having a fastener assembly 18 located in aligned bores 14 and 16, respectively. The fastener assembly includes a pin 20, a combination expanding and filler sleeve 22, and a locking collar 24.

The pin 20 has an enlarged head 26 at one end and a pull portion 28 at its opposite end with the pull portion being formed with a plurality of annular grooves to facilitate being gripped by the chuck jaws of a tool for setting the fastener. The tool can be of a construction well-known in the art and need not be described here in detail. A serrated or grooved portion 30 is located next to the pull portion 28 and serves as a guide for the pin 20 as it is engaged by the tool. A breakneck groove 32 is located proximate the serrated portion 30 and represents the weakest section of the pin 20 at which the shank of the pin 20 is designed to sever at the conclusion of the setting operation. A locking groove 34 is located next to the breakneck groove 32 and serves a purpose to be described. A straight portion 36 is located next to the locking groove 34 and is connected to an enlarged diameter portion 38 which is located proximate the head 26 and defines therewith a stop shoulder 40. The maximum diameter of the straight portion 36, locking groove portion 34, breakneck groove portion 32, serrated portion 30, and pull portion 28 are substantially equal and, of course, less than the diameter of enlarged portion 38.

The combination expanding and filler sleeve 22 is located upon the pin 20 and has an expanding sleeve portion 42 and a filler sleeve portion 44 which are connected together at one of their ends by a reduced section breakneck portion 46. The filler sleeve portion 44 has an enlarged countersink head 48 at its opposite end which is matably located within a countersink 50 in bore 16 in workpiece 12. The end of the filler sleeve portion 44 connected to the breakneck portion 46 extends beyond the rearwardmost surface of the workpieces 10 and 12 for a purpose to be presently understood. The combination sleeve 22 has a through bore 52 which is of a diameter substantially equal to the maximum diameter of the straight portion 36, serrated portion 30, etc., and terminates at its forward end coaxially with the sleeve head 48 in an enlarged, outwardly flared opening 54 and has at its rearward end a counterbore 56 of a diameter equal to the diameter of the enlarged portion 38 of pin 20. The counterbore 56 extends completely through the expanding sleeve portion 42 and into the filler sleeve portion 44 to an extent less than the axial length of the enlarged portion 38 of pin 20 and defines with the bore 52 a radial shoulder 58. The shoulder 58 is located at a substantial distance past the reduced section portion 46 within the filler sleeve portion 44 for a purpose to be presently seen. The outside diameter of the combination sleeve 22 is substantially equal to the diameter of bores 14 and 16 and hence the combination sleeve 22 can be located therein with the sleeve head 48 located within the countersink 50. The outside surface 60 of the expanding sleeve portion 42 tapers radially inwardly in a direction from its outer end toward the reduced section portion 46; hence, the wall thickness of the expanding sleeve portion 42 decreases gradually from its outer end to the reduced section portion 46. The outer surface 61 at the end of the filler sleeve portion 44 proximate the reduced section portion 46 is chamfered for a purpose to be seen.

The locking collar 24 can be considered to be comprised of a pair of concentric ring portions and thereby to have an inner ring portion 62 and a reduced thickness outer ring portion 64. The inner ring portion 62 fits matably within the forward part of the enlarged opening 54.

The fastener assembly 18 can be set in the manner described in the above-mentioned patent to Brilmeyer and hence a relative axial force is applied between the inner ring portion 62 of locking collar 24 and the pin 20. As this axial force is increased the combination sleeve 22 fractures at the reduced section portion 46 and the expanding sleeve portion 42 is forced over the chamfered end 61 of the filler sleeve 44. This telescoping action causes the expanding sleeve portion 42 to expand radially outwardly with the chamfered end portion 61 facilitating both the initial expansion and telescoping action. The expanding sleeve portion 42 is moved into contact with the rearward surface of workpiece 10; an increase in the relative axial force pulls the workpieces 10 and 12 tightly together and causes the expanding sleeve portion 42 to bulb or buckle radially outwardly. Since the wall thickness of the expanding sleeve portion 42 decreases in a direction toward the workpieces 10 and 12, the minimum section will be located proximate to the rearward surface of workpiece 10 and hence bulbing or buckling of the expanding sleeve portion will occur at this rearward surface, thereby providing good fastening characteristics. It has been found that to insure buckling at the rearward surface while still providing maximum strength, the outer surface 60 is provided with a taper of 1½° (see FIGURE 1). Note that by providing the sleeve portions 42 and 44 to be integral fabrication and assembly are facilitated and it is assured that the taper on the expanding sleeve portion 42 will be properly oriented on the pin 20.

Upon an additional increase in the axial force the stop shoulder 40 is moved into engagement with the internal shoulder 58 in filler sleeve portion 44 thereby preventing further relative axial movement between the pin 20 and the filler sleeve 44. Note at this time the locking groove 34 is located within the enlarged opening 54 in the enlarged head 48. Upon a further increase in the axial force the inner ring portion 62 is severed from the outer ring portion 64 and is forced into the cavity defined by the locking groove 34 and the enlarged opening 54 thereby creating a positive lock between the pin 20 and sleeve 22. As the axial force is again increased the shank of the pin 20 is severed at the breakneck 32 and the setting operation is completed, leaving a fastener as shown in FIGURE 2. Note that by locating the shoulder 58 at a position removed from the end of the filler sleeve portion 44 the forces required to radially expand that section are increased over those forces required to radially expand the very end itself; hence the stop characteristics of the fastener 18 are much improved thereby assuring that the pin 20 will not move axially relative to the filler sleeve portion 44 as the axial force is increased to sever the inner ring portion 62 from the outer ring portion 64 and thereby assuring that the locking groove 24 will be in the correct position relative to the enlarged opening 54.

Thus it can be seen that the fastener of the present invention fulfills the objective set forth and provides a substantial improvement over similar fastening devices.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A blind fastener for connecting a plurality of workpieces having aligned openings therethrough, said fastener comprising: an expanding sleeve, a filler sleeve and a pin member having an enlarged pin head at one end, said filler sleeve having an enlarged head at one end and having a through bore and being locatable upon said pin member, said expanding sleeve having a through bore and being locatable on said pin member between said filler sleeve and said pin head with said expanding sleeve being axially spaced from said filler sleeve, said filler sleeve being locatable within the aligned bores with said enlarged head engaging a forward surface of the workpieces and with the opposite end of said filler sleeve extending beyond a rearward surface of the workpieces, means at the opposite end of said pin member adapted to be gripped by a tool for setting the fastener whereby a relative axial force can be applied between said pin member and said filler sleeve through said expanding sleeve with said one end of said expanding sleeve being moved telescopically over said opposite end of said filler sleeve and into engagement with the rearward surface of the workpieces whereby the workpieces are pulled together, said expanding sleeve having a wall gradually decreasing in thickness in a direction from said pin head toward said filler sleeve with the decreasing wall thickness being of a preselected gradient whereby said expanding sleeve buckles radially outwardly proximate the rearward surface upon an increase in the relative axial force, and means for locking said pin member to said filler sleeve member after said expanding sleeve has buckled, said expanding sleeve decreasing in thickness over approximately most of its length with this decrease in thickness being located at the outer surface of said expanding sleeve whereby said outer surface is tapered.

2. The fastener of claim 1 in which said gradient on said expanding sleeve is defined by a tapered surface having an angle of taper at least as great as approximately 1½°.

3. A blind fastener for connecting a plurality of workpieces having aligned openings therethrough, said fastener comprising: a combination expanding and filler sleeve member and a pin member, said combination sleeve member including a filler sleeve portion having an enlarged head at one end, an expanding sleeve portion, and a reduced section portion connecting said expanding sleeve portion at one end to the opposite end of said filler sleeve portion, said combination sleeve member being locatable within the aligned bores with said enlarged head engaging a forward surface of the workpieces and with said opposite end of said filler sleeve portion extending beyond a rearward surface of the workpieces, said combination sleeve member having an axial bore for supporting said pin member therein, said pin member having an enlarged pin head at one end in engagement with the opposite end of said expanding sleeve portion, means at the opposite end of said pin member adapted to be gripped by a tool for setting the fastener whereby a relative axial force can be applied between said pin member and said combination sleeve member, said reduced section portion being the weakest portion of said combination sleeve member and being fracturable thereat at a preselected axial force whereby said expanding sleeve portion and said filler sleeve portion are separated, said one end of said expanding sleeve portion as separated being movable telescopically over said opposite end of said filler sleeve portion by said axial force and into engagement with the rearward surface of the workpieces whereby the workpieces are pulled together, said expanding sleeve portion having a wall gradually decreasing in thickness in a direction from said pin head toward said filler sleeve portion with the decreasing wall thickness being of a preselected gradient whereby said expanding sleeve portion buckles radially outwardly proximate the rearward surface upon an increase in the relative axial force, said wall of decreasing thickness being defined by a taper on the radially outer surface of said wall with said taper extending generally the length of said expanding sleeve portion and with said taper having an angle of taper at least as great as approximately 1½°, said enlarged head having an enlarged opening, said pin member having a locking groove located intermediate its ends and adapted to be located within said enlarged openings when the fastener is set, means deformable into the cavity defined by said enlarged opening and said locking groove after said expanding sleeve portion has buckled, said pin member having an enlarged portion proximate said pin head to define thereby an annular stop shoulder, said combination sleeve member having a counterbore of a size to receive said enlarged portion with said counterbore extending through and expanding portion and terminating at a point intermediate the ends of said filler sleeve portion and adjacent to said opposite end of said filler sleeve portion, said counterbore at its termination defining a radial shoulder engageable with said stop shoulder at a position in which said locking groove is properly located within said enlarged opening with said pin member being prevented from further axial movement upon the engagement of said radial and stop shoulders.

References Cited by the Examiner

UNITED STATES PATENTS

| | | | |
|---|---|---|---|
| 626,040 | 5/1899 | Rowlands | 85—73 |
| 2,108,842 | 2/1938 | Bazzoni | 85—72 |
| 2,298,203 | 10/1942 | Eklund | 85—74 |
| 2,397,111 | 3/1946 | Huck | 85—72 |
| 2,813,568 | 11/1957 | Kilmarx | 85—72 |
| 2,887,003 | 5/1959 | Brilmyer | 85—72 |
| 3,078,002 | 2/1963 | Rodgers | 85—73 |
| 3,107,572 | 10/1963 | Orloff | 85—73 |

FOREIGN PATENTS 48,678   11/1930   Norway.

CARL W. TOMLIN, *Primary Examiner.*

EDWARD C. ALLEN, *Examiner.*

M. PARSONS, JR., *Assistant Examiner.*